United States Patent [19]
Meister

[11] 3,838,604
[45] Oct. 1, 1974

[54] MOTION COMPENSATING MECHANISM

[75] Inventor: Frank S. Meister, Canoga Park, Calif.

[73] Assignee: Lockheed Aircraft Corporation, Burbank, Calif.

[22] Filed: Apr. 5, 1973

[21] Appl. No.: 348,270

[52] U.S. Cl. ................................. 74/99, 244/75
[51] Int. Cl. ........................................ F16h 21/44
[58] Field of Search ............ 74/99, 519; 244/75, 76

[56] References Cited
UNITED STATES PATENTS

| | | | |
|---|---|---|---|
| 2,876,968 | 3/1959 | Chaplin et al..................... | 244/76 R |
| 3,114,521 | 12/1963 | Beardsley.......................... | 244/76 R |
| 3,332,643 | 7/1967 | Toner................................ | 244/75 R |

Primary Examiner—Benjamin W. Wyche
Assistant Examiner—Wesley S. Ratliff, Jr.
Attorney, Agent, or Firm—Billy G. Corber; Frank L. Zugelter

[57] ABSTRACT

A motion compensating mechanism, adaptable to an aircraft and each of its engines for absorbing motion of an engine relative to the airframe without transmitting its effect to either the throttle setting or the pilot's engine power control lever. Conversely, the pilot may feed an input to change the engine's power setting regardless of the particular position of the engine relative to the airframe at the instance of such input. In either situation, the pilot has exclusive control of the throttle engine setting by his input into the engine power control lever.

6 Claims, 7 Drawing Figures

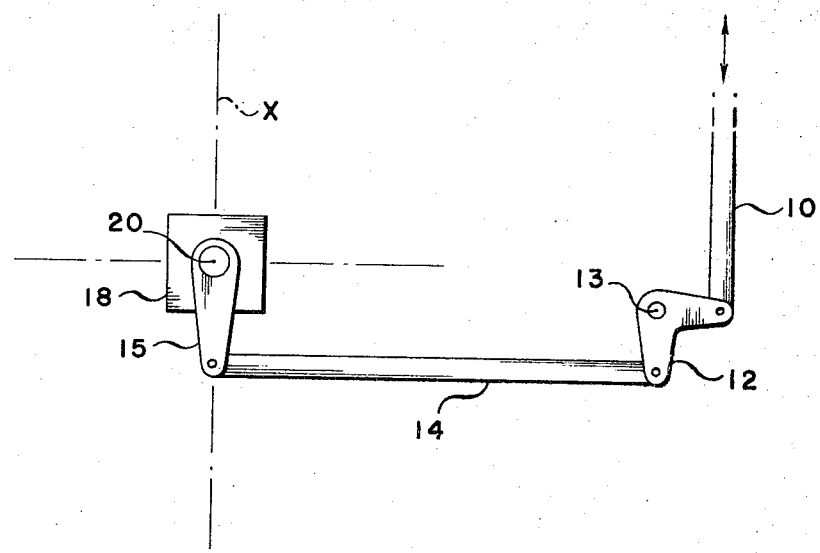
FIG. 1
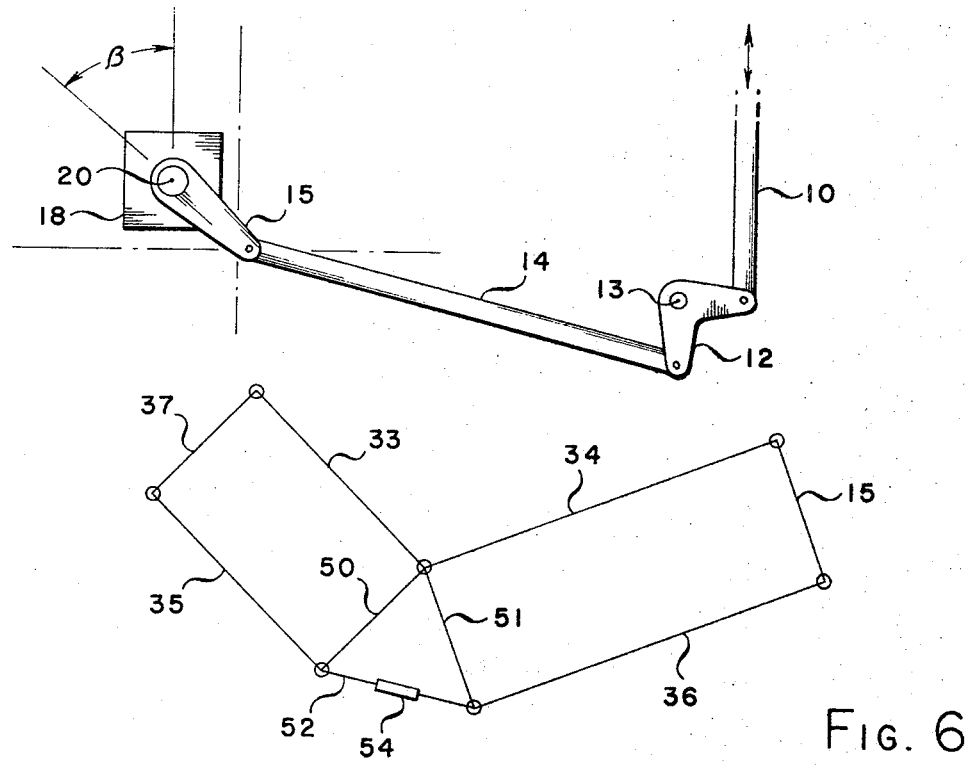
FIG. 2
FIG. 6

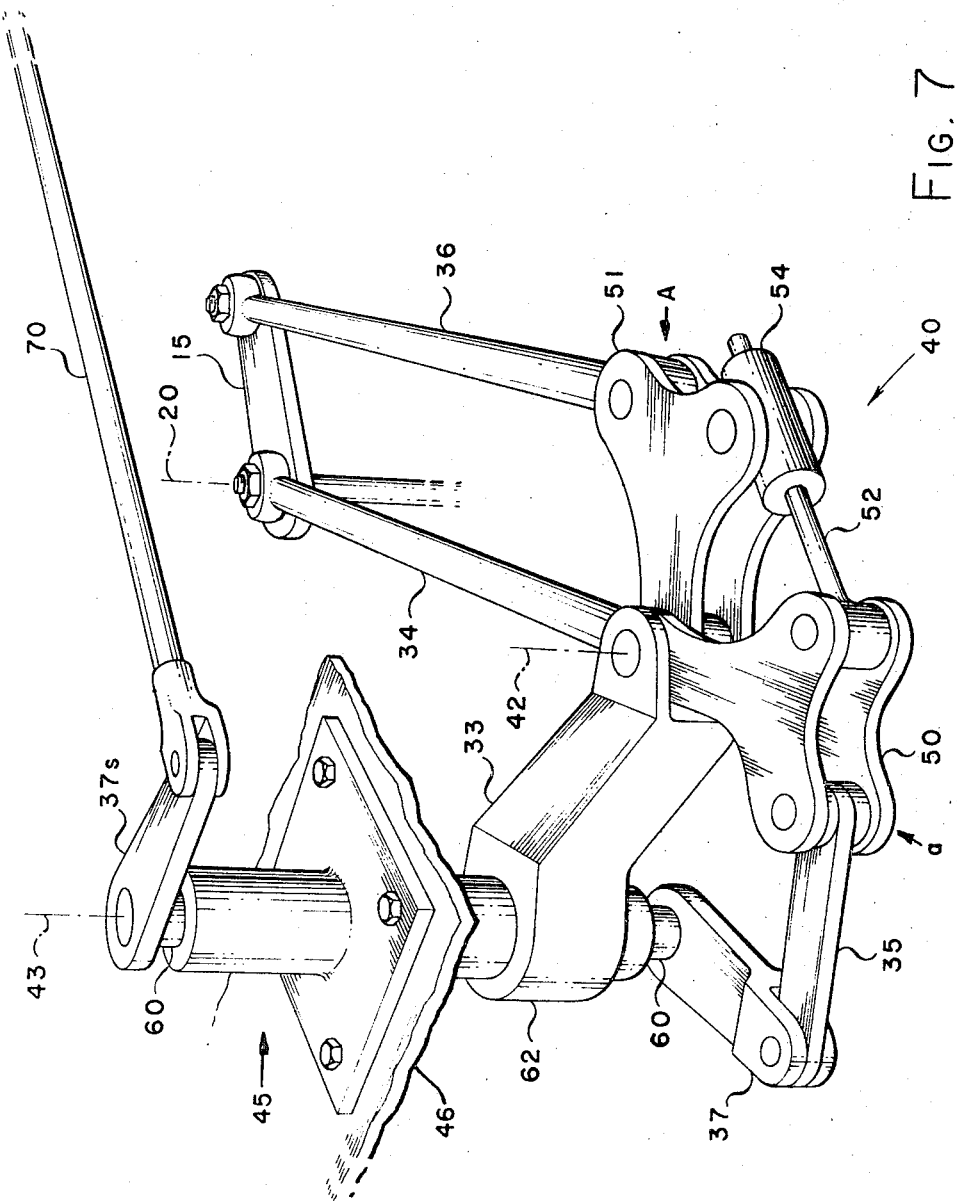

MOTION COMPENSATING MECHANISM

BACKGROUND OF THE INVENTION

1. Field of the Invention

The field of art to which the invention is most likely to pertain is located in a class generally relating to rods and mechanisms.

2. Description of the Prior Art

Aircraft such as the C-5A, 747, and DC-10 use push-pull armored cable in a section of the engine control system interface with pylon or airframe structure. The Boeing 707, and 123/720 use push-rod linkage control designs unlike the subject matter of this invention. The C-130 uses a push-pull connecting rod linkage in a single parallelogram of linkages in its control mechanism.

PROBLEMS IN THE PRIOR ART

Generally, engine-to-airframe motion could not be satisfactorily compensated for in an expedient manner, and also presented a space problem with the largesse of the mechanisms or systems which were utilized. Higher friction controls have been required, with inherently greater losses in hysteresis. Also, particular engines were developed exclusively for a given aircraft configuration, without the advantage of changing to another engine. Furthermore, the interfacing between engine and airframe contributed to difficulties in designing and fabricating a motion compensator that would efficiently operate in ease of maintenance and installation procedures.

The present invention provides a precise engine-to-airframe motion compensation not heretofore realized by existing systems. The largest possible error in a throttle setting is limited to 0.1 percent, and this would be due only to wind gusts upon an engine installed on soft mounts. In the case of an engine being installed on hard mounts, any error that would occur in the utilization of this invention is nil.

In addition, the invention affords a basis for commonality between a given aircraft configuration and a number of different model engines which can be made to readily interface therewith. Also, disconnect and connect of engine-to-airframe is facilitated.

SUMMARY OF THE INVENTION

This invention relates generally to relative motion compensating mechanisms, and in particular, is directed to a system or mechanism for compensating any uncontrollable movement, such as an aircraft engine with respect to the aircraft's frame and which otherwise would adversely affect its throttle setting.

An object of this invention is to provide compensation for relative motion between a moving point or element and a fixed point, element or position by utilization of a mechanism.

An object of this invention is to absorb any engine motion relative to an airframe and which otherwise would (inadvertently) move the throttle control for the engine.

Another object of this invention is to correct for compound movement of an engine; i.e., along any line or plane of movement the engine may take relative to fixed airframe structure.

A further object of this invention is to provide freedom of engine motion in any direction, but nevertheless to provide such a control for such angular movement that no undesired feedback to the engine power control lever, controlling the throttle on the engine, can occur.

Another object of this invention is to reduce the spaced required for a mechanism of this nature or for this purpose.

Another object of this invention is to minimize or eliminate loss in hysteresis movement for an engine motion compensation system.

Another object of this invention is to facilitate disconnection and connection of the engine from and to the airplane structure or pylon without disturbing the engine power control rigging.

A further object of this invention is to provide an exceptionally satisfactory interfacing of controls between the engine and the airframe structure.

A still further object of the invention is to provide interchangeability of different modeled engines to a particular modeled aircraft.

These and other objects and advantages will become more apparent upon a full and complete reading of the following description, appended claims thereto, and the accompanying drawing comprising three sheets.

BRIEF DESCRIPTION OF THE DRAWING

FIGS. 1 and 2 illustrate plan views of a mechanism connecting a power control lever at a pilot's station to a throttle control lever mounted on an input control box to an engine.

FIG. 6 is a schematic diagram of a simplified version of the invention.

FIG. 7 is a perspective view of the invention as it is installed in an aircraft.

DESCRIPTION OF THE PREFERRED EMBODIMENT

Introduction

Figure 3:
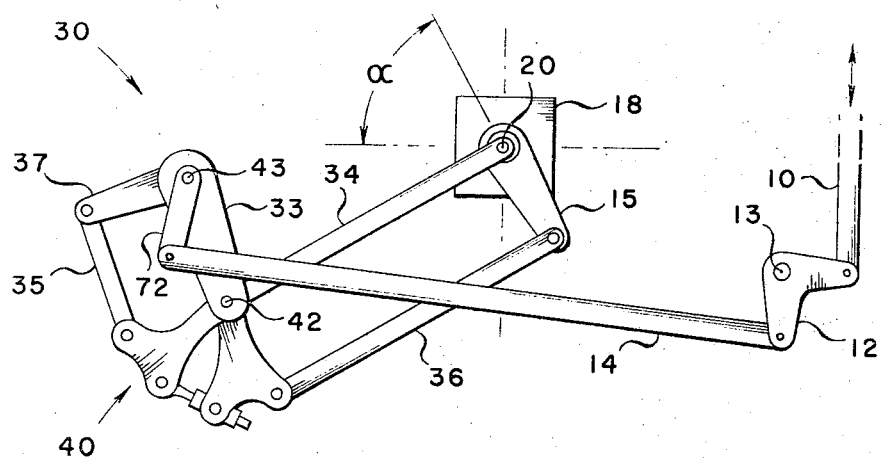
FIGS. 3, 4 and 5 illustrate plan views of an embodiment of the invention.

Engine power control systems in modern-day commercial jet aircraft provide direct means of controlling the power output for each of its engines. For example, the system may be of a direct-drive rod, cable and pully type, such as utilized in the L-1011 aircraft manufactured by Lockheed Aircraft Corporation, Burbank, California. A set of controls is provided for each of the powerplants in the aircraft using this invention. Each set of such controls comprises, generally, an engine power control lever operated by a pilot at his station, a reverse thrust lever also located at such station, an auto-throttle clutch assembly, cam-operated switches, a throttle cable tension regulator, an engine motion compensator mechanism, and a torque shaft assembly. This invention is primarily concerned with a motion compensator mechanism, and its adaptation to an aircraft engine, and it is not necessary to describe in detail the other indicated aircraft components except to the extent if necessary to provide an understanding of the invention and its application to an aircraft. However, by way of the preceding comments, one skilled in the art may become conveniently oriented in regard to the invention and its utilization to an aircraft and thereby facilitate his understanding of the invention.

As wing engines are mounted in their respective pods, each pod being supported by a pylon, the pylon or fuselage-mounted controls must properly and efficiently interface with the engine-mounted controls. The throttle setting on the engine, for example, must be under the exclusive control of the engine power control lever, and never vice versa. In instances where the pilot himself does not feed an input through his engine power control lever to a throttle lever controlling the engine power setting, any relative motion of the engine to its airframe may cause a change in the engine throttle setting, unless compensated for. It is through this motion compensator mechanism that such a potential change in the engine throttle setting is absorbed. As it will become more fully apparent hereinafter, this mechanism accommodates the motion between the engine and the airframe without affecting the engine power setting and without transmitting motion inputs back to the engine power control lever.

FIGS. 1 and 2 illustrate the effect of a change in engine throttle setting where the relative motion occurring between the engine and the airframe is not compensated for. In FIG. 1, a push-pull rod 10, operatively connected to an engine power control lever (not shown) is pivotally connected to one end of a rotatable bell crank member 12 whose center pivots about a fixed axis 13 on airframe structure. An actuating rod 14 is pivotally attached to the other end of the rotatable bell crank member 12, and operates a control lever 15 which is secured to an input shaft 16 incorporated with an input control box 18 securely mounted upon an engine. The control lever 15 controls the throttle setting for the engine by its rotation about its axis 20 through the input control box 18.

FIG. 2 illustrates the effect of a wind gust or other load impact upon the engine and its housing. The engine, and thus its input control box 18, moves relatively to the airframe structure. Assuming that the rod 10 does not translate (thus, the engine power control lever not changing its position), the control lever 15 is caused to rotate through an angle $\beta$. FIG. 2 shows that an additional distance is developed between the axis 13 for the bell crank member 12 and the axis 20 for the input control box 18. It should be understood that the engine and its input control box 18 may also move in a direction decreasing the distance between the axes 13, 20 but nevertheless, the control lever 15 would move through an angle. In either instance, the throttle setting has changed without a change in or an input fed by the engine power control lever. Such movement of the engine, of course, and thus angle $\alpha$, is in any line or plane relative to fixed airframe structure, and the magnitude and the direction of the load that it may experience during flight is obviously unpredictable.

Thus, the engine would experience a change in throttle setting. A series of these changes obviously affects the flight envelope of the aircraft as a whole. The flight would rather be a jerky or staccato-like sequence of movements and felt by those in the aircraft as the engine throttle setting would raise and lower the thrust of its engines. Furthermore, the pilot would not have exclusive control over the power setting for the engine.

Description

Figure 4:
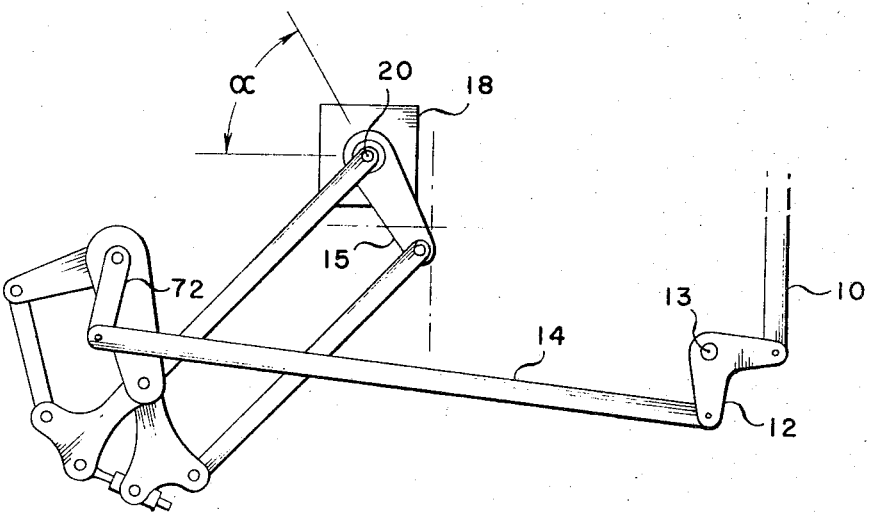
Figure 5:
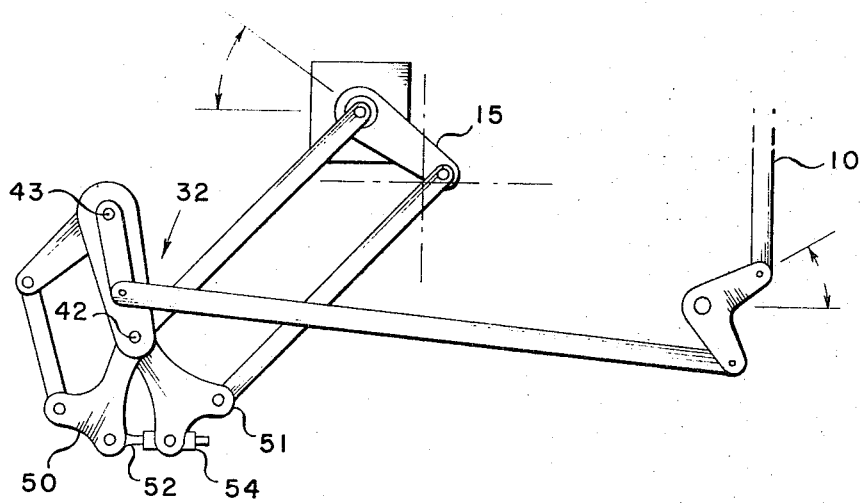

FIGS. 3, 4 and 5 illustrate a preferred embodiment of the invention which compensates for the above-described undesirable change in throttle setting. FIG. 3 corresponds to FIG. 1. FIG. 4 corresponds to FIG. 2 wherein the input control box 18, fixed to the engine, has moved in any plane or along any line relative to the fixed axis 13 of the bell crank member 12. It may be noted here that the control lever 15 in FIG. 4 remains at the same angle $\alpha$ relative to its input control box 18 as its angle in FIG. 3, but only the distance between the axes 13 and 20 has changed. Both angle and distance are changed in the illustration of FIGS. 1 and 2. FIG. 5 illustrates a change in the angle of the throttle control lever 15 relative to its control box 18 but only because of a pilot input through the rod 10, irrespective of the relative position at a given instance of an engine and its control box 18 to its pylon or airframe structure.

The subject matter of the invention is generally designated as a motion compensator mechanism 30, and it should be understood that the invention is not limited in its application to an aircraft. In its application to an aircraft, the mechanism 30 is situated between the engine and the pylon or aircraft structure and its purpose is to absorb engine motion in any plane, and which motion occurs relative to the airframe, without changing the angle of the engine-mounted control lever 15 on its input box 18. The compensator mechanism 30 comprises a linkage assembly 32 (FIG. 5) and a pair of rigid links 35, 36 (FIG. 3) generally parallel but in spaced and offset relationship to the linkage assembly 32, such relationship being provided by a control arm 37, the control lever 15, and a connecting or leverage assembly 40. The linkage assembly 32 includes two rigid members 33, 34 having their adjacent ends pivotally attached together, such as with radial bearings (not shown) and as at the axis 42 (FIGS. 3–5). The opposite end on member 33 is rotatably mounted about an axis 43, while the opposite end on member 34 is pivotally mounted, such as with a spherical ball bearing (not shown), about the axis 20. As installed in an aircraft, the axis 43 represents the central axis of a torque shaft assembly 45 (FIG. 7) which is fixed to airframe structure 46 on the airframe, and the axis 20 represents the central axis or pivot about which the throttle control arm 15 pivots on its input control box 18 secured to the aircraft's engine. In an aircraft installation, it is the distance between these two axes 43 and 20 which changes with motion of the engine due to wind gusts and the like, rather than the distance between the axes 13, 20 (FIGS. 1, 2) with which we are concerned.

In FIGS. 3–5, the one end of the rigid link 35 is pivotally attached, such as by ball bearings (not shown), to the free end of the control arm 37. The rigid link 35 extends in generally parallel fashion to the member 33, and in like manner, the other link 36 has its one end pivotally attached, such as by ball bearings (not shown), to the free end of the throttle control lever 15. The link 36 extends in generally parallel fashion with the rigid member 34. The other ends of the links 35, 36 approach each other but are not joined directly together. Rather, as shown in FIGS. 3–5, these ends are pivotally attached such as by ball bearings (not shown), to corresponding ends of a pair of bellcrank levers 50, 51 having their other ends pivotally joined in apex, such as by a radial bearing (not shown), to and about the axis 42. A third member 52 has each of its ends pivotally joined or attached, such as by ball bearings, to corresponding apeces a, A of the bellcrank levers 50, 51, and an adjusting means 54 is mounted on the third member 52 for adjusting its length and thereby vary the distance as desired between the axes 43 and 20 for purpose of assembly and installation in a given environment such as in an aircraft's airframe.

In the aircraft installation itself (FIG. 7), the connecting members 50, 51, constitute two bellcrank assemblies which are adjustable about the axis 42. When joined together as shown in FIG. 7, they constitute the adjustable leverage assembly 40. In operation, the elements 50, 51 are in fixed relationship to each other; i.e., they function in unison by rotating together about the axis 42. The third member 52 becomes an adjustable eyebolt assembly 54. The eyebolt assembly is made adjustable for purposes of rigging procedures. The engine power controls within the airframe are rigged to a predetermined value between axis 43 and the pilot's flight station. The adjusting means 54 is provided to finely adjust the subject matter of this invention as applied to aircraft, in its interfacing disposition between its engine and airframe mountings. To match the predetermined power setting of the engine with the same required value of the airframe power controls, a control rigging is required upon the interfacing due to dimensional tolerances of the compensator assembly and the relationship of airframe and engine installation tolerances. The means 52 is adjusted in its length to accommodate the required rigging procedure which determines the positions for the axes 43 and 20.

It may also be observed from FIG. 7 that a second control arm 37s is provided to function in unison with the arm 37. The arm 37 is secured to the base of a rotatable shaft 60 suitably mounted in the torque shaft assembly 45. The second control arm 37s is likewise secured to the rotatable shaft 60, however, at its top, to accommodate a ball bearing pivotal connection to an actuating member or rod 70 which is the equivalent of the rod 14 of FIGS. 3–5. The arm 37s of FIG. 7 is shown as an arm 72 in FIGS. 3–5. Also, the arm 33 of FIGS. 3–5 becomes a bifurcated member integrally formed on a sleeve 62 suitably mounted for rotation in the torque shaft assembly 45. In aircraft adaptation, it is through the actuating member 70 that the pilot's input to his power throttle lever is felt and which purposefully changes the engine power setting via the input control box 18. The actuating member 70 is, in known fashion, operatively connected to a cable tension regulator, earlier mentioned, which of course is functionally connected to the pilot's engine power control lever.

The bellcrank 12 of FIGS. 3–5 may be considered symbolic of a cable tension regulator mentioned earlier. Also, it is feasible to connect the cable tension regulator directly to the top of the rotatable shaft 60.

Operation

The description of the operation will be generally directed to the aircraft adaptation of the invention, as this will provide a sufficient disclosure for an understanding of how the subject matter of the invention operates.

In the case of the engine moving relative to the axis 43, without any power input through the actuator 70 from the pilot, FIG. 4 shows such movement over the from the engine's previous position (FIG. 3) relative to the fixed axis 43. The angle α has not changed, and thus, the throttle control lever 15 has not fed a different power setting into the engine. The position of the bellcrank 12 has not changed about its axis 13. What has changed in position are all of the elements constituting the mechanism 30 with the exception of the control arm 37, and although the lever 15 moves, it does not change its angle α with the input control box 18. The arm 37 is held in place by the actuator member 70 whose position is determined by the position of the bellcrank member 12. And, of course, the object to be achieved is maintaining the angle α for the control lever 15. The control arm 37 along with the control lever 15 does not rotate, however, all the other elements rotate about their respective axes 43, 20 and pivot about their respective pivotal connections. In this manner, the compensator 30 absorbs the change in relative motion of the distance between the axes 43, 20 and the control lever 15 does not change its angle α. Feedback to the power setting control lever at the pilot's station is eliminated.

Input through the push-pull rod 10 reflects a pilot's change in the setting of the engine power control lever at his station, with the effect of changing the angle α a desired degree. As the bellcrank member 12 rotates and the connecting rod 14 is translated, the actuator rod 70 rotates about the axis 43. And the movement of the control arm 37 is translated through the link 35, the leverage assembly 40, and the link 36 to the control lever 15 which thus is caused to rotate about its axis 20. The linkage assembly 32 remains motionless during the pilot input which effects the desired change in the engine power setting.

In actual aircraft practice, a cable tension regulator (not shown) is utilized rather than the bellcrank member 12 in order to maintain cable tension, so that variations in cable-to-aircraft-structure length due to thermal and mechanical factors can be controlled. The Lockheed L-1011 aircraft uses a quadrant-type regulator (know in the art) mounted above the engine in the aircraft structure.

The connect-and-disconnect points occur at the pivot 42 aNd the pivot connection of link 36 to its bellcrank 51. In this manner, should the engine be removed, the interfacing member 34 and link 36 remain with the engine, all of which provides ease of maintenance and installation.

Also, the invention is as feasible in operation with the center engine of an aircraft powered by three engines as it has been shown in regard to a wing-mounted engine.

Any relative deflections which may occur to the mechanism 30 in directions other than those in the general plane in which the elements 15, 32, 35, 36, 37 and 40 are situated are readily compensated for by spherical bearings in the ends of the links 35 and 36.

Pursuant to the requirements of the patent statutes, the principle of this invention has been explained and exemplified in a manner so that it can be readily practiced by those skilled in the art to which it pertains, or with which it is most nearly connected, such exemplification including what is presently considered to represent the best embodiment of the invention. However, it should be clearly understood that the above description and illustrations are not intended to unduly limit the scope of the appended claims, but that therefrom the invention may be practiced otherwise than as specifically described and exemplified herein, by those skilled in the art, and having the benefit of this disclosure.

Therefore, what I claim as patentably novel is:

1. A mechanism for compensating the motion between a moving point or element and a fixed position, comprising in combination:

a pair of rigid members having their adjacent ends pivotally attached together and having their opposing ends respectively rotatably mounted to the fixed position and to a pivot connection mounted on the moving point or element, a first lever having one end rotatably mounted at the fixed position, a second lever having one end rotatably mounted on the pivot connection mounted on the moving point or element, a pair of links in corresponding offset to to said pair of rigid members the corresponding opposing ends of said links but not their adjacent ends being respectively pivotally attached to the other ends of said first and second levers, and a leverage assembly pivotally joined to the pivot connection on the one hand and being pivotally connected to the adjacent ends of said links on the other hand, and means rotatably mounted on the fixed position for uniform rotation thereabout with said first lever, said second lever rotating only upon actuation of said rotatably mounted means at any position for the moving point or element relative to the fixed position, said second lever not rotating merely upon the change of position of the moving point or element relative to the fixed position.

2. The mechanism of claim 1 including an actuating means for said rotatably mounted means.

3. The mechanism of claim 1 wherein said leverage assembly comprises:

a pair of bellcrank levers and a connecting member pivotally joining together the apeces of said bellcrank levers, first ends of said bellcrank levers being pivotally joined together at the pivotal attachment for said pair of rigid members, the second ends of said bellcrank levers being respectively pivotally connected to the adjacent ends of said links.

4. The mechanism of claim 3 wherein said connecting member is adjustable in its length.

5. The mechanism of claim 4 wherein said connecting member is an adjustable eyebolt assembly.

6. The mechanism of claim 5 including an actuating means for said rotatably mounted means.

* * * * *